United States Patent [19]

Umemoto et al.

[11] 3,979,721

[45] Sept. 7, 1976

[54] PULSE CODE MODULATION RECORDING AND REPRODUCING APPARATUS

[75] Inventors: Masuo Umemoto, Tokyo; Kouichi Tomatsuri, Yokohama; Yasunori Kanazawa, Hachioji, all of Japan

[73] Assignee: Hitachi, Ltd., Japan

[22] Filed: Mar. 21, 1975

[21] Appl. No.: 560,882

[30] Foreign Application Priority Data
Apr. 1, 1974 Japan.............................. 49-35648

[52] U.S. Cl................. 340/146.1 F; 340/146.1 AB; 360/32; 360/53
[51] Int. Cl.²..................... G11B 27/36; H03K 5/18
[58] Field of Search............ 340/146.1 AB, 146.1 F; 360/32, 53

[56] References Cited
OTHER PUBLICATIONS

Iwamura, H. et al. *Pulse–Code–Modulation Recording System* In J. Aud. Eng. Soc. 21(7):pp. 535–541, Sept. 1973.

Sato, N. *PCM Recorder A New Type of Audio Magnetic Tape Recorder*, in J. Aud. Eng. Soc., 21(7): pp. 542–548, Sept. 1973.

*Primary Examiner*—R. Stephen Dildine, Jr.
*Attorney, Agent, or Firm*—Craig & Antonelli

[57] ABSTRACT

A PCM recording and reproducing apparatus comprising an error detecting circuit for detecting a frame including at least one word information signal with an error, the frame being a reproduction signal read from a recording medium on which certain pulse coded information is recorded in a frame distribution system, and a compensating circuit for compensating the reproduced information signal by the use of the output signal from the error detecting circuit, thereby removing the adverse effects of information dropout in spite of a high density recording.

4 Claims, 7 Drawing Figures

PULSE CODE MODULATION RECORDING AND REPRODUCING APPARATUS

BACKGROUND OF THE INVENTION

1. Field of the Invention

The present invention relates to a PCM (Pulse Code Modulation) recording and reproducing apparatus and more particular to error detecting and error compensating circuits in the reproducing part of a PCM recording and reproducing apparatus in which the digital information is recorded in a frame distribution system on the recording medium such as a magnetic tape in the running direction of the recording medium.

2. Description of the Prior Art

A PCM recording and reproducing apparatus has hitherto been known as a typical application of the digital recording technique. Such an apparatus is classified into two types: One is of the type using a rotary head mechanism as in the case of the magnetic video tape recorder (VTR); the other is of the type using a fixed head.

In the VTR, the relative velocity of the moving tape to the rotating head is very high, for example, the relative velocity ranging from 10 m/sec to 40 m/sec. Accordingly, this tape of apparatus is suitable for a recording system requiring a wide frequency band width such as a PCM recording system, and is advantageous in that it may provide an apparatus being stable against noise with a high redundancy. However, it has a problem in that the construction is complex and the manufacturing cost is high, since it inherently requires some parts rotating at a high speed and high accuracy.

On the other hand, in the system using a fixed head with multi-tracks, the recording of the information on the tape may be made with a wide frequency band width without any reduction of recording wave length. The reason for this is that an increase of the transmission rate of the pulses which is caused when the information signal is coded or quantized, is absorbed by dispersing it to the respective tracks on the tape. Moreover, in this system, an economical and simpler construction may be expected for a reason that there is no need of the mechanism operating at a high speed and high accuracy, unlike the VTR.

The PCM recorder using the fixed head with multi-track is classified into two types from the standpoint of distributing on the respective tracks the tape coded pulse trains. One is a bit distribution system and the other is a frame distribution system.

In the bit distribution system, a series of coded pulses are sequentially distributed from MSB (Most Significant Bit) to LSB (Least Significant Bit) on the respective tracks each arranged in parallel but normal to the running direction of the tape. Each interval between adjacent bits on a track of the tape corresponds to the period of the sampling frequency. For example, if the running velocity of the tape is taken as 38 cm/sec and the sampling frequency 40 kHz, then the bit interval on the track is 9.5 $\mu$m.

A "dropout" which is a very small blank or defect on a magnetic tape produced in manufacturing process of the tape, is inevitable in magnetic tapes. If a dropout of about 100 $\mu$m occurs on a track, approximate 10 samples of the information are sequentially dropped out when considering the above example.

In the frame distribution system, a train of pulses coded or quantized through an analogue to digital converter are grouped into a series of frames each corresponding to predetermined number of samples, and the frames in turn is sequentially distributed on the respective tracks in the tape. A series of incoming pulse trains each of one frame are reduced in the transmission rate in accordance with the number of the tracks on the magnetic tape and then the coded pulse trains are recorded on the tape along the respective tracks.

For example, if the running speed of the magnetic tape is taken as 38 cm/sec, the sampling frequency as 40 kHz, the bit number constituting one word as 12 bits, and the number of tracks is 12, then the bit interval of adjacent bits is in the order of 9.5 $\mu$m, as in the case of the above bit distribution system. In this case, the recording length of one sample is 9.5 $\mu$m × 12 and thus the dropout of about 100 $\mu$m causes only one to two samples to be damaged.

Thus, the frame distribution system remarkably improves the adverse effect by the dropout over the bit distribution system. It is customary to use an error check bit for checking the recorded information to which errors may be introduced due to disturbance or the like when the digital information is recorded or reproduced on the recording medium. In the frame distribution system, one frame consists of a plurality of words each also consisting of a number of information pulses corresponding to one sample value and an error check bit located following the former pulse train of information.

The frame distribution system has a defect arising from the fact that an error check bit is located immediately after an information word pulse train corresponding to one sample value. That is, when the dropout occurs, the error check bit as well as the information word pulse train is damaged. This will be described below in more detail.

It is assumed that one word consists of 14 bits in which 12 bits are assigned to the data bits and 2 bits to the check bits. If a large dropout sufficiently covering one word occurs, the digital information to be reproduced generally becomes random in the bit arrangement. This disarrangement of course slightly depends on the methods of modulation and demodulation when the digital information is recorded and reproduced on and from the recording medium.

Under such a random information, even if any type of check system is employed, there is the probability of ¼ of the information word having the error being extracted from the information recorded on the magnetic tape, so far as the check bit of 2 bits is used. In other words, there is a probability of ¼ that the random information may be transferred as correct information to the output system of the recording apparatus.

For this, there has been proposed another system in which, in the case of deciding whether an information word at time $t_n$ is correct or not, its correctness is decided only when the word at time $t_n$ has no error and further several words before and after the word include no error. This proposed system is effective in the case where the signal error rate is low and the error check is directed to solely remove the problems resulting from the dropout. It is expected, however, that the signal error rate becomes high when the information-recording density is made high for reducing the size of the recording apparatus. Further, the quality of the sound reproduced will be deteriorated, since occurrence of the dropout and a single word as well, respectively, are considered to be the occurrence of errors in several words.

SUMMARY OF THE INVENTION

Accordingly, a principal object of the present invention is to provide an error detecting circuit and an error compensating circuit in a PCM recording and reproducing apparatus in which a combination of the digital information and the check information are recorded on the magnetic tape in the running direction of the tape in accordance with the frame distribution system, whereby the adverse effect by the dropout may be removed without deterioration of the reproduced sound or picture quality.

In accordance with the present invention, the objective is achieved by a construction comprising a circuit for detecting any error included in the words of one frame, a circuit for detecting a signal change between adjacent words which is in excess of a predetermined level when at least one error is detected in the former circuit, and a circuit to interrupt the transmission of the signal including the error to the output system of the PCM recording and the reproducing apparatus, when the signal change exceeding a predetermined level is detected.

The above-mentioned and other objects and features of this invention will be apparent from the following description taken in conjunction with the accompanying drawings.

DESCRIPTION OF THE PREFERRED EMBODIMENTS

Figure 1:
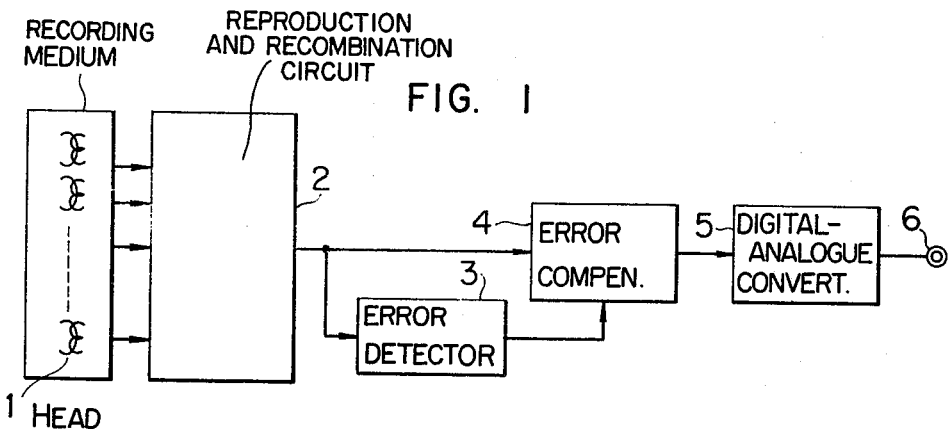
FIG. 1 illustrates in block form a schematic diagram of a PCM recording and reproducing apparatus employing a frame distribution system according to the present invention.

Reference is now made to FIG. 1 illustrating in block form the reproducing part of a PCM recording and reproducing apparatus employing a frame distribution system according to the present invention. In the figure, designated by the reference numeral 1 is a group of magnetic heads corresponding to the number of tracks of the recording medium such as magnetic tape. The reference numeral 2 designates a reproduction and recombination circuit for reproducing the digital information recorded on the magnetic tape along the tracks and recombining or rearranging them into another arrangement of the digital information, as will subsequently be described. An error detecting circuit 3 serves to detect the error which may be included in the reproduced digital information from the recombination circuit 2. Upon detection of an error by the error detecting circuit 3, an error compensating circuit 4 acts to remove the digital information including the error and to retain the preceding digital information, i.e. the digital information just followed by the error-including digital information. A digital to analogue converter (hereinafter referred to simply as a D/A converter) connected with an output terminal 6 is used for converting the digital information modulated according to the PCM to an analogue form of information.

In the circuit construction of FIG. 1, the error detecting circuit 3 and the error compensating circuit 4 are essential to the present invention. To assist in the understanding of the present invention, the operations of the circuits 3 and 4 will be explained hereinafter, according to FIGS. 2 and 4.

Figure 2:
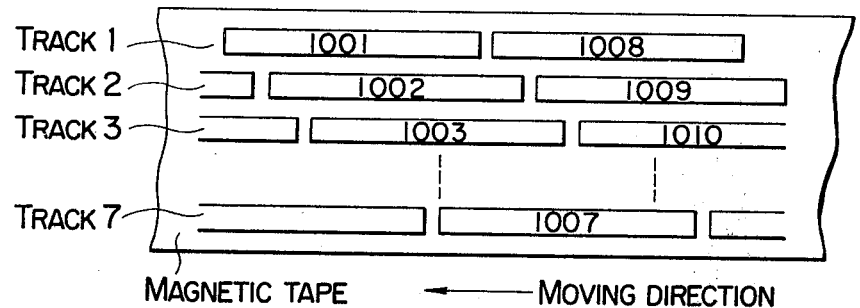
FIG. 2 shows a pattern of the information recorded on the magnetic tape in accordance with a frame distribution system.

Turning now to FIG. 2, there is shown an arrangement or a distribution pattern of the digital information recorded on the recording medium such as the magnetic tape in the manner of the frame distribution. In the figure, blocks 1001 to 1010 each are representative of a frame unit of information, and blocks 1001 to 1007 are correspondingly located on the tracks 1st to 7th of the magnetic tape.

Figure 3:
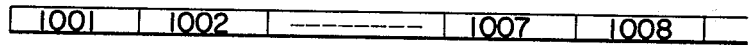
FIG. 3 shows an arrangement of the frames in the signal appearing at the output of a recombination circuit 2 in FIG. 1.

Referring now to FIG. 3, there is shown an arrangement of digital information in a time series fashion into which the digital information arranged in several groups and recorded on the parallel tracks as shown in FIG. 2 is serialized through the recombination or rearranging operation of the reproduction and recombination circuit 2. It will be seen from FIG. 3 that the respective information frames 1001 and 1008 being adjacent each other on the same first track in FIG. 2 are distanced each other by the number of tracks, after the processing of the reproduction and recombination circuit 2. In other words, the adjacent frames 1001 and 1002, for example, in the output signal of the reproduction and recombination circuit 2 are located on different tracks, respectively, i.e. the first track and second track on the magnetic tape. Accordingly, even if the frame 1001 is caused to have an error due to the dropout occurrence in the first track, the information frame 1002 still retains its correctness regardless of the existence of the error in the frame 1001, since these tracks are separated.

Figure 4:
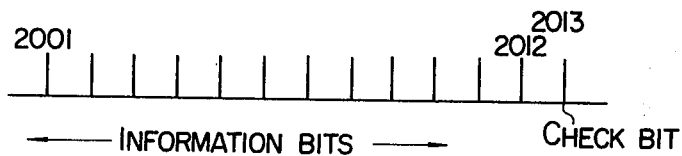
FIG. 4 is a word structure of the word constituting one frame.

The structure of one word corresponding to one sample value in this instance is shown in FIG. 4. Bits 2001 to 2012 indicate the information bits to be processed. Bit 2013 is a check bit. It should be noted that the extra check bit being a 1, i.e. the fixed pattern system, is employed in this example, for purpose of explanation and by way of example, and thus there are many other redundant coding system applicable to this invention.

For an arrangement that one word consists of 13 bits and the magnetic tape has 7 tracks, 6 words is preferable for constituting one frame according to the law of frame distribution. Thus, 78 bits constitute one frame. The bit density on each track is 200 bits per millimeter if the sampling frequency of the original recording signal is 40 kHz, and the running velocity of the magnetic tape is 38 centimeter per second.

Figure 5:
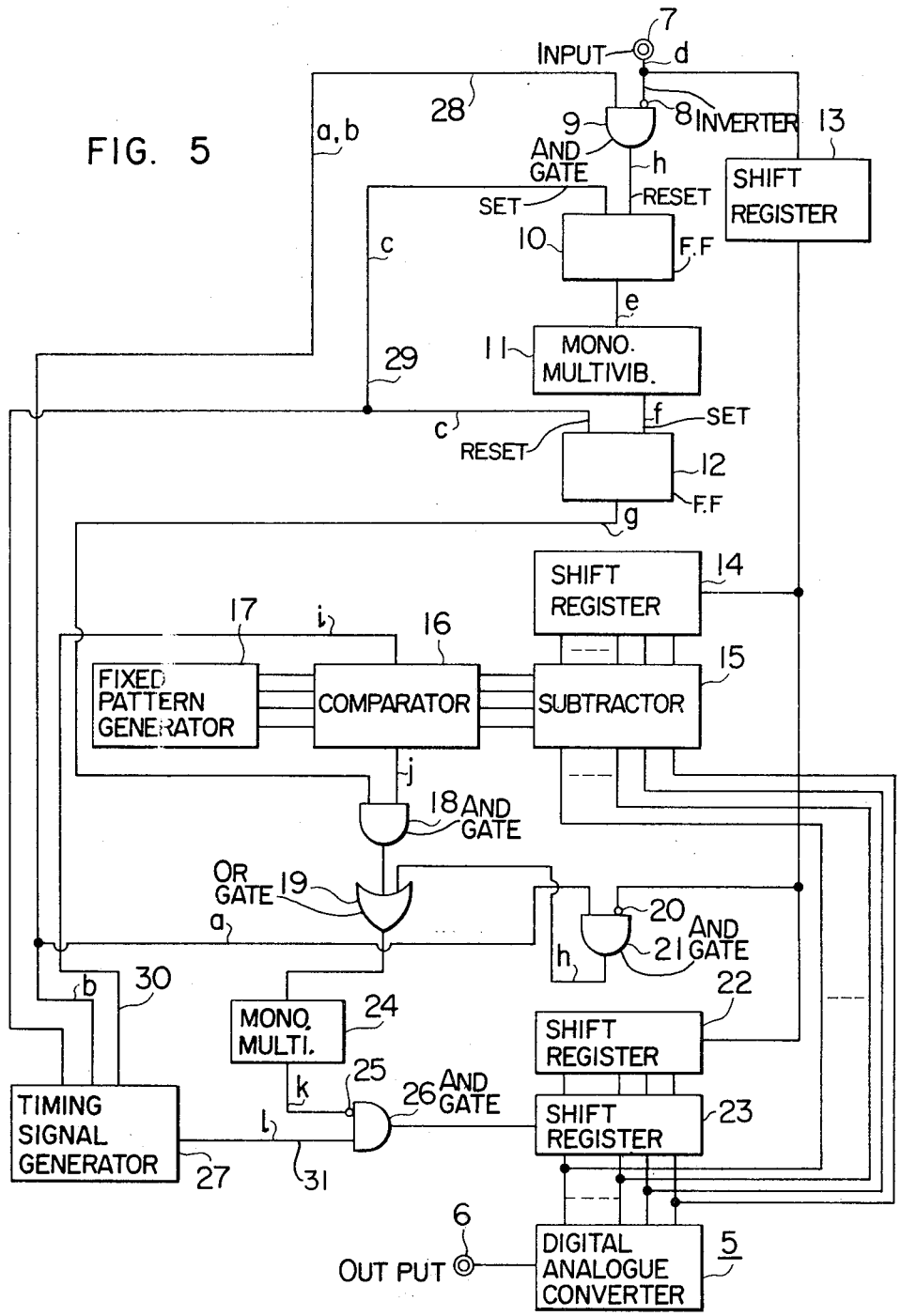
FIG. 5 is a circuit diagram of a circuitry including an error detecting circuit and an error compensating circuit, which is an embodiment of the present invention.

Referring now to FIG. 5, there is shown a schematic circuit diagram of an embodiment of a circuit according to the present-invention, which is the reproducing part of a PCM recording and reproducing apparatus and, as noted previously, comprises the error detecting circuit 3 and the error compensating circuit 4 and a D/A converter (FIG. 1). In the figure, an input terminal 7 receives the information from the reproduction and recombination circuit 2 (FIG. 1). Designated by reference numerals 8 and 9 are an inverter and an AND-gate circuit, respectively. The reference numerals 10 and 12 each are representative of a flip-flop circuit having a set and a reset terminals (hereinafter referred to as a flip-flop), respectively. A one-shot multivibrator is designated by the reference numeral 11. A shift register 13 has a storage capacity permitting the storage of 78 bits whose number corresponds to that of bits accommodated in one frame. A shift register 14 has a storage capacity of 12 bits. The reference numerals 15, 16, 17, 18, 19, 20 and 21, respectively, denote a subtractor, a comparator, a fixed pattern generating circuit, and AND gate circuit, an OR gate circuit, an inverter and an AND gate circuit. A shift register 22 has a storage capacity of 13 bits. The reference numeral 23 indicates a parallel input-parallel output type shift-register capable of storing 12 temporarily. The reference numerals 24, 25, and 26, respectively, indicate a one-shot multivibrator, an inverter, and an AND gate circuit. A timing signal generator 27 acts to supply timing pulses to the circuits mentioned above, and the timing pulses are generated in a well known manner. A plurality of output lines for delivering timing pulses to appropriate circuits are connected with the timing pulse generator and are as follows: an output line 28 for delivering error check timing pulses; an output line for supplying frame synchronizing pulses; an output line 30 for delivering timing pulses for detecting the result of comparison; and an output line 31 for transferring timing pulses to be used for setting the register 23.

Figure 6:
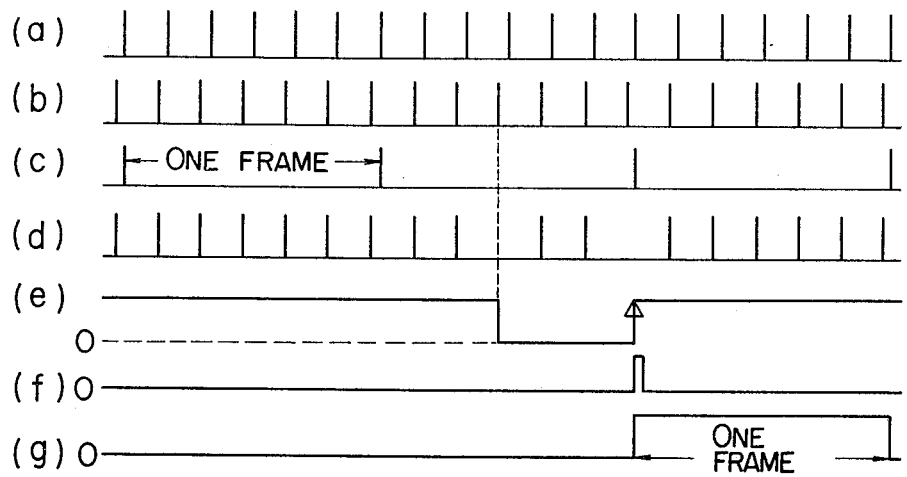
FIGS. 6 and 7 are timing diagrams illustrating the operation of the circuitry according to the present invention, respectively.

FIG. 6 shows a set of timing diagrams for illustrating the operation of the circuitry in FIG. 5, in which $a$ represents the word synchronizing pulses, and $b$ the timing pulses to be used for checking errors, both the pulses appearing on the output line 28. Designated by $c$ are the frame synchronizing pulses appearing on the output line 29. $d$ designates check bits in the digital information fed through the input terminal 7, with information bits located between these adjacent check bits. The check bit in the present example is of a fixed pattern system so that when the dropout or others occurs, the check bit is turned to be a 0 (as an example, such case occurs at the time point shown in a dotted line). For purpose of clarity, the information bits are not shown in the figure.

Returning to FIG. 5, an inverted signal out-putted from the inverter 8 upon receipt of the digital information obtained from the input terminal 7, and the error-check timing pulse $b$ along the output line 28 of the timing signal generator 27 are applied to the AND gate circuit 9 which is enabled to permit the error-check timing pulse $h$ therethrough only when the check bit is 0. The output of the AND gate circuit 9 is connected to the reset terminal of the flip-flop 10 whose set terminal is connected to the timing signal generator 27 via the output line 29 for carrying the frame synchronizing pulses $c$. The waveform of the output signal of the flip-flop 10 is shown by the $e$ in FIG. 6. The one-shot multivibrator 11 produces a pulse $f$ at the positive going of the output signal of the flip-flop 10.

As seen from the above, since the flip-flop 10 is set by the frame synchronizing pulse $c$ for each frame, the one-shot multivibrator 11 produces the pulse $f$ whenever at least one check bit in one frame is turned to be 0. The pulse width of the pulse from the one-shot multivibrator 11 is slightly larger than that of the frame synchronizing pulse $c$.

The flip-flop 12 receives at the set terminal the output signal $f$ of the one-shot multivibrator 11 while at the reset terminal the frame synchronizing pulse $c$. For this, in response to the presense of the output pulse at the output of the one-shot multivibrator 11, the flip-flop 12 produces a gate signal with the pulse width one frame long, as shown in FIG. 6 $g$. The shift register 13 having 78 bit capacity is used to delay the information signal by one frame in order that the gate signal $g$ is synchronized with the information signal.

In the absence of error represented by change of the check bit, the output of the check bit remains "off" condition so that the output signal from the comparator 16 is blocked in transmission through the AND gate 18. Meanwhile, the check bit is again verified through the cooperation of the inverter 20 and the AND gate circuit 21 similarly as in the case of the inverter 8 and the AND gate circuit 9. When no error is detected, no error-check timing pulse appears at the output of the AND gate circuit 21. When no error is found, thus, no pulses are inputted to both of the inputs of the OR gate circuit 19 the result is that the one-shot multivibrator 24 is held in "off" condition.

Further, the digital information outputted from the shift register 13 is fed to the shift register 22 where the information transmission mode is changed from a serial mode to a parallel mode. The output signal in parallel from the shift register 22 is loaded to the shift register 23 and in turn to the D/A converter 5 where the digital information fed thereto is converted into the corresponding analogue information which in turn is outputted from the output terminal 6.

Figure 7:
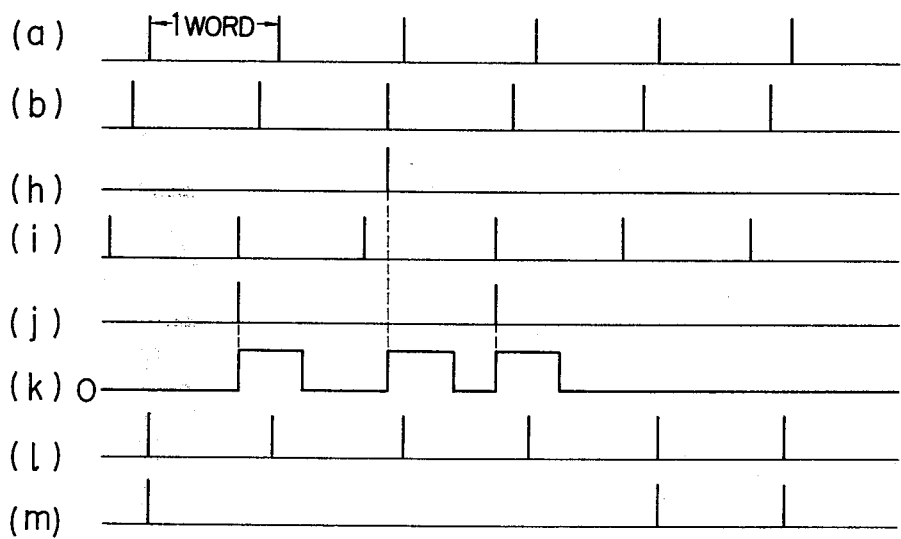

FIG. 7 is a set of timing diagrams for illustrating the operation of the circuitry according to the present invention when at least one check bit is included in one frame. In the figure, $a$ and $b$, respectively, denote the word synchronizing pulses and the error-check timing pulses, as in FIG. 6.

As stated previously, the inverter 20 and the AND gate circuit 21 cooperate to verify the check bit whether the digital information involves an error or not. If the error is detected, the error-check timing pulses $h$ appear at the output of the AND gate circuit 21. The digital information from the shift register 13 is fed to the shift register 14 and then to the subtractor 15 where calculation is made of the difference between the information involving the error and that just followed by the former. The result of subtraction is compared with a reference level by means of the comparator 16 and the fixed pattern generator 17.

The timing pulses for detecting the result of the comparison are timed in synchronism with the 12th bit of the information bits, since the comparison or decision whether the difference is larger than the fixed level or not is effected when the digital information of one word is entered into the shift register 14. When a difference exceeding the fixed level is detected, the comparator 16 produces at the output the pulses $j$ which in turn is delivered to one of the inputs of the AND gate circuit 18. The AND gate circuit 18 with the pulses $j$ at one input terminal, in response to the application of the output $g$ of the flip-flop 12 to the other input terminal, is enabled to permit the pulses $j$ to pass therethrough. In other words, whenever at least one check bit in the frame exhibits an error, the AND gate circuit 18 is enabled.

The respective output pulses of the AND gate circuits 18 and 19 are gated through the OR gate circuit 19 thereby to be loaded to the one-shot multivibrator 24. The output $k$ of the one-shot multivibrator 24 is used to disable the AND gate circuit 26 with the result that the timing pulses for reading out the contents of the shift register 22 is not applied to the shift register 23. These timing pulses are designated by the reference character 1 and each located between the 13th bit of the word bit and the first bit of the succeeding word, i.e. correspond to the word synchronizing pulses. According to such arrangement, the pulses $l$ to set the shift register 23 are interrupted during operation of the one-shot multivibrator 24 with the result that the preceding word signal is held without any change. The description hitherto described may be summarized as in the following table.

no detection is conducted of the existence of the dropout through another method. Incidentally, an increase of check bit from now one bit to two bits of course enables the above probability to further be reduced.

As seen from the foregoing description, the present invention has successfully attained many advantages. First, since the frame distribution system is employed in the present invention, few samples are dropped when the dropout occurs. The adverse effects due to the dropout of a check bit found in a conventional frame distribution system is removed by verifying the signal level change between adjacent information words. Since the dropout is detected at each frame, the detection efficiency of the dropout is enhanced. Moreover, click noise or pulsed noise inherent to dropouts are removed by restricting the frequency band of the information signals in the frame with the dropout. For this, Table

| Method of Discrimination Output Circuits Outputting Result of Discrimination | In One Frame By Check Bit | In One Sample By Check Bit | In One Sample By Level Change | Result of Discrimination for the Samples |
|---|---|---|---|---|
| | Flip-Flop 12 | AND Gate 21 | Comparator 16 | |
| Kinds of Discrimination | When an Error is Exhibited in the Check Bit of Any Sample within One Frame | When the Sample Whose Check Bit Exhibits an Error | | Error |
| | | When the Sample Whose Check Bit Shows Correct | When the Level Change of the Comparator 16 is Large | Error |
| | | | When the Level Change of the Comparator 16 is Small | Correct |
| | When No Error is Exhibited in the Check Bit of Any Sample within One Frame | | | Correct |

(The column with a slanted line indicates that the corresponding output circuit is irrelevant to the result of discrimination.)

It will be seen from the above table that whenever any bit in one frame exhibits an error, the information including a level change exceeding a predetermined level as well as the information with the error in the frame is interrupted in transferring to the D/A converter, and the preceding word information is held.

Incidentally, it is inevitable that the frequency characteristic of the information is restricted in the frame involving the error, since the information having a level change exceeding a predetermined value is selectively interrupted in transferring. It is to be noted, however, that the probability of occurence of the frame involving error depends upon the signal error rate and the probability of occurence of the dropout, and thus is not too large.

The probability will next be discussed that the existence of a dropout in a frame fails to be detected for the reason that the check bit is erroneously 1 in spite of the occurence of the dropout. Assume now that the presense of a dropout causes the check bit to lose its regularity, and that the dropout occurs at an arbitrary bit position in the frame. With 6 words in one frame, the probability under consideration is given $$1/6\left\{(½)+(½)^2+(½)^3+(½)^4+(½)^5+(½)^6\right\}\doteqdot 0.16$$

Thus, this probability is very small. In this calculation, further assumptions are made that the arrangement of the information bits is made entirely random and that even if the signal error rate in a transmission system increases, the number of frames whose frequency band is restricted just increases and the effects thereof are negligible in practical use.

We claim:

1. A PCM recording and reproducing apparatus in which pulse coded information is recorded on a recording medium in a frame distribution system, comprising:
   a. a recording medium having a plurality of tracks along which the pulse coded information is recorded in the frame distribution system;
   b. a plurality of heads to be confronted with said corresponding tracks;
   c. a recombination circuit for rearranging the output signals from said respective heads into the time serial fashion of the signal;
   d. an error detecting circuit for detecting a frame including at least one word having an error in the output signal of said recombination circuit;
   e. a compensating circuit for compensating the output signal from said recombination circuit by the use of the output signal of said error detecting circuit, and
   f. a digital to analogue converter for converting the compensated output signal of said recombination circuit into an analogue signal.

2. A PCM recording and reproducing apparatus according to claim 1, wherein said compensating circuit is so constructed that a frame including at least one word having error manifested by a check bit is replaced by a preceding frame.

3. A PCM recording and reproducing apparatus comprising:
- a recording medium having a plurality of tracks arranged in a parallel fashion on which pulse coded information in frames, each composed of a plurality of words having an information sample and at least one check bit, are distributed;
- a plurality of heads to be confronted with said corresponding tracks;
- a recombination circuit for rearranging the output signal from said respective head into time serial fashion of the signal;
- an error detecting circuit for detecting a frame including at least one word having an error in its check bits, for detecting the at least one word of the frame having the error in its check bits, and for detecting when a level difference between a correct word in the frame having no error in its check bits and the preceding word in the frame exceeds a predetermined value;
- a compensating circuit for compensating the output signal from said recombination circuit by replacing said detected error word and said detected correct word having the excessive level difference by the respective preceding word; and
- a digital to analogue converter for converting the compensated output signal into an analogue signal.

4. A PCM recording and reproducing apparatus according to claim 1, wherein said error detecting circuit and said compensating circuit comprises:
- a circuit including a flip-flop for producing an output signal during one frame time period following a frame including an error;
- a delay circuit for delaying the output signal from said recombination circuit by one frame time period;
- a first and a second register for storing the output signal of said delay circuit;
- a third register for storing a word of said second register in parallel by a driving signal;
- a subtractor for producing the difference between the signals stored in said first and third registers;
- a comparator for detecting whether the output signal from said subtractor exceeds a predetermined level;
- an AND gate driven by said flip-flop circuit and for gating the output signal of said comparator;
- an error detecting circuit for detecting an error indication of the error check bits from the output signal of said delaying circuit;
- an OR gate circuit into which the output of said AND gate and said error detecting circuit are both applied; and
- a circuit for driving said third register by use of the output signal from said OR gate circuit.

* * * * *